United States Patent
Kumaki et al.

(10) Patent No.: US 10,953,606 B2
(45) Date of Patent: Mar. 23, 2021

(54) USE OF POLYVINYL ALCOHOL HAVING A LOW SODIUM ACETATE CONTENT IN 3D PRINTING PROCESS

(71) Applicant: KURARAY CO., LTD., Kurashiki (JP)

(72) Inventors: Yousuke Kumaki, Troisdorf (DE); Moritz Baier, Hofheim (DE)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 16/342,287

(22) PCT Filed: Oct. 16, 2017

(86) PCT No.: PCT/EP2017/076380
§ 371 (c)(1),
(2) Date: Apr. 16, 2019

(87) PCT Pub. No.: WO2018/073189
PCT Pub. Date: Apr. 26, 2018

(65) Prior Publication Data
US 2020/0055256 A1 Feb. 20, 2020

(30) Foreign Application Priority Data
Oct. 18, 2016 (EP) .................................... 16194484

(51) Int. Cl.
| | | |
|---|---|---|
| *B29C 64/40* | (2017.01) | |
| *B29C 64/118* | (2017.01) | |
| *B33Y 70/00* | (2020.01) | |
| *B33Y 80/00* | (2015.01) | |
| *B29K 29/00* | (2006.01) | |

(52) U.S. Cl.
CPC ............ *B29C 64/40* (2017.08); *B29C 64/118* (2017.08); *B29K 2029/04* (2013.01); *B33Y 70/00* (2014.12); *B33Y 80/00* (2014.12)

(58) Field of Classification Search
CPC ...................................................... B29C 64/40
See application file for complete search history.

(56) References Cited

U.S. PATENT DOCUMENTS

| | | | |
|---|---|---|---|
| 8,404,171 | B2 | 3/2013 | Heenan |
| 2013/0307193 | A1 | 11/2013 | Johnson et al. |
| 2013/0310507 | A1 | 11/2013 | Tummala et al. |
| 2015/0126670 | A1 | 5/2015 | Tummala et al. |
| 2015/0306821 | A1 | 10/2015 | Hirata et al. |
| 2016/0059445 | A1* | 3/2016 | Tummala ............. B29O 64/245 264/308 |
| 2016/0288206 | A1 | 10/2016 | Ohtaki et al. |
| 2017/0022341 | A1 | 1/2017 | Bayer et al. |
| 2017/0291965 | A1 | 10/2017 | Schmidt et al. |

FOREIGN PATENT DOCUMENTS

| | | |
|---|---|---|
| CA | 2 963 165 A1 | 4/2016 |
| CN | 104861216 A | 8/2015 |
| CN | 105150532 A | 12/2015 |
| CN | 105268977 A | 1/2016 |
| CN | 105462130 A | 4/2016 |
| JP | 2016-179584 A | 10/2016 |
| WO | WO 2015/108768 A1 | 7/2015 |

OTHER PUBLICATIONS

International Search Report dated Dec. 20, 2017 in PCT/EP2017/076380 filed Oct. 16, 2017, 4 pages.
English translation of the International Preliminary Report on Patentability and Written Opinion of the International Searching Authority dated May 2, 2019 in PCT/ EP2017/076380 filed Oct. 16, 2017, 7 pages.
Combined Chinese Office Action and Search Report dated Sep. 30, 2019, in Patent Application No. 201780064174.6, 14 pages (with English translation).

* cited by examiner

*Primary Examiner* — Larry W Thrower
(74) *Attorney, Agent, or Firm* — Oblon, McClelland, Maier & Neustadt, L.L.P.

(57) ABSTRACT

The invention is directed to a process of manufacturing a three-dimensional object by depositing and solidifying molten polyvinyl alcohol (PVOH) to form a support structure depositing and solidifying a molten thermoplastic polymer on the support structure to form a three-dimensional preform dissolving the support structure to from the three-dimensional object characterized in that the polyvinyl alcohol (PVOH) has an alkaline acetate content of less than 0.5 wght %.

13 Claims, No Drawings

USE OF POLYVINYL ALCOHOL HAVING A LOW SODIUM ACETATE CONTENT IN 3D PRINTING PROCESS

The invention is directed to the use of PVOH having a low sodium acetate content as support material in a 3D printing process and the process of thereof.

BACKGROUND 3D printing processes of thermoplastics are gaining more and more importance in production of plastic parts. Due to the process of depositing molten thermoplastic polymers, certain structures like hollow sections can not be built directly from the thermoplastic polymer. In such cases, first a support structure is printed on or around the final structure from the thermoplastic polymer is build. The support structure is prepared from a thermoplastic polymer which can be removed by thermal treatment or solvents which do not affect the thermoplastic polymer providing the desired structure.

Thermoplastic polymers which can be used as support structure are for example waxes, polyethylene glycole, High Impact Polystyrene (HIPS), polylactid acid, poly(2-ethyl-2-oxazolidone) or hydroxypropyl methylcellulose as disclosed in WO2015/108768A1.

Furthermore, it is known to utilize polyvinyl alcohol (PVOH) as support material in 3D printing processes, since PVOH is a thermoplastic material with a broad melting range which can be easily removed from the final printed structure by dissolving in water or aqueous alkaline solution. In this respect the use of amorphous PVOH as support material in a 3D printing processes is described in U.S. Pat. No. 8,404,171.

The printing process i.e. depositing molten thermoplastic polymer is usually performed at temperatures around 200° C. Accordingly, the PVOH used as support material should not melt under these printing conditions and/or should have a melting point as high as possible, otherwise the precision of the support structure can be imparted. Furthermore, the PVOH should be removable without residues by a fast and chemically non-destructive solution process.

Surprisingly it was found that a lower the ash content of PVOH, has a positive influence on both the thermal stability of PVOH as support structure in 3D printing and the subsequent solution process.

The ash content of PVOH originates from its production process, in which polyvinyl acetate is hydrolyzed (or saponified) by strong bases like alkaline hydroxide. The resulting alkaline salts like sodium acetate is mostly removed from the desired PVOH, but some traces may remain in the material. In order to control the quality of the hydrolyzation process, the PVOH is burned and the remaining, non-combustible material weighted as "ash content". However, the ash obtained by this process originates from the hydrolyzation process as alkaline acetate and can be easily measured by conductivity of an aqueous solution of PVOH.

Object of the invention is therefore a process of manufacturing a three-dimensional object by
  depositing and solidifying molten polyvinyl alcohol (PVOH) to form a support structure
  depositing and solidifying a molten thermoplastic polymer on the support structure to form a three-dimensional preform
  dissolving the support structure to from the three-dimensional object wherein the polyvinyl alcohol (PVOH) has an alkaline acetate content of less than 0.5 wght %.

Such printing processes are called "dual material printing" and are in general known to the person skilled in the art.

The term "alkaline acetate" refers to any alkaline or earth alkaline salt obtained in the hydrolysation process of polyvinyl acetate to yield polyvinyl alcohol PVOH, like sodium acetate, potassium acetate or magnesium acetate.

The alkaline acetate for example, the sodium acetate (NaOAc) content of PVOH is determined by measuring the conductivity of a 4-20 wt. % solution of polyvinyl alcohol in deionized water. As sodium acetate (NaOAc) is the only significant ionic compound in PVOH, the conductivity of the solution is proportional to the NaOAc concentration. Thus, the NaOAc content can be calculated from the measured conductivity by reference to calibration measurements.

Dual material printing requires that with one print head is active depositing molten material, while the other print head is in idle mode. Idle mode means that no material flow is taking place in this nozzle. Usually, the temperature of the idle print head needs to be reduced to avoid thermal degradation of the polymer material still present in the print head. This however slows down the entire printing process due to frequent reheating of the nozzle. PVOH having a low content of alkaline acetate allows a more reliable printing process, especially by reducing the risk that the printing nozzle gets blocked due to thermally degraded PVOH.

With improved thermal stability of the PVOH, the idle temperature of the print head can be higher or even no reduction of temperature is necessary for certain idle times. Furthermore, the idle times of PVOH being heated in the print head without material flow during printing with the other print head can be longer.

The alkaline acetate/ash content of PVOH can be reduced by extensive, repetitive washing, for example with methanol, methyl acetate or mixtures thereof.

Preferable, the polyvinyl alcohol (PVOH) composition used in the process of the invention has one or more of the following properties:
  an vinyl actetate content of at least 10 mol %, at least 15 mol % or at least 20 mol %, with an upper limit of 50 mol % to allow water solubility
  a degree of polymerization of 200-3000 or 250-2000 or 300-1500
  a degree of hydrolysis DH of 60-99 or 70-95% or 72-90%
  a viscosity of a 4% aqueous solution of 2-20 mPa s or 3-10 mPa s
  an alkaline acetate content of less than 0.5 wght %, less than 0.3 wght % or even less than 0.1 wght %.

The polyvinyl alcohol (PVOH) composition may comprise one or more PVOH grades, differing in vinyl actetate content and/or degree of polymerization and/or degree of hydrolysis and/or viscosity. Further, the polyvinyl alcohol (PVOH) may contain as repeating units vinyl alcohol, vinyl acetate and up to 20 Mol % of olefinic monomers. Suitable repeating units are for example, but not limited to: ethylene, 1-olefins (e.g. propylene, 1-butene, isobutylene), 1-butene-3,4-diacetate, 1-butene-3,4-diol, vinyl ethers (e.g. methyl vinyl ether, ethyl vinyl ether, n-propyl vinyl ether, isopropyl vinyl ether), N-vinyl amides (e.g. N-vinylpyrrolidone, N-vinylcaprolactam), isopropenyl acetate, isopropanol, allyl acetate, allyl alcohol. The exact composition can be adjusted as necessary for the printing process so long as the total alkaline acetate content is in the described ranges.

Due to the low alkaline content, the molten polyvinyl alcohol (PVOH) can be deposited in the process of the invention at a temperature of at least 170° C., preferable least 180° C. or more preferred at least 190° C.

The thermoplastic polymer may then be deposited on the support structure at a temperature of at least 140° C.

Optionally the polyvinyl alcohol (PVOH) composition may comprise up to 20% by weight (based on the total weight of the composition) of one or more plasticizers. Any compound known to plasticize PVOH such as water, glycerine, diglycerine, sorbitol, ethylene glycol, diethylene glycol, polyethylene glycol, pentaerythritol, dipentaerythritol, propylene glycol, trimethylolpropane, di-trimethylolpropane, triethanolamine may be used for the purpose of the invention.

As thermoplastic polymer, any polymer selected from the group consisting of polylactic acid (PLA), acrylonitrile-butadiene-styrene copolymer (ABS), polyamides (PA), polycarbonates (PC), polyethylene terephthalate (PET), polyethylene terephthalate copolymers (PETG), polyhydroxyalkanoates (PHA), wood filled composites, metal filled composites, carbon fiber filled composites, polyvinylbutyral (PVB), thermoplastic elastomers (TPE), thermoplastic polyurethanes (TPU), polyolefins, polypropylenes (PP), acrylonitrile styrene acrylate (ASA), polyacrylates, polymethacrylates, and mixtures thereof can be used.

After the printing process, the support structure i.e. the polyvinyl alcohol (PVOH) is dissolved in water and only the three-dimensional object remains.

Measurement Alkaline Acetate Content

PVOH is solved in distilled water to provide solutions having concentration of 4, 8 and 20 by weight and adjusted to a temperature of 20-25° C. The conductivity cell (for example type "cond 315i", commercialized by WTW) is likewise adjusted to a temperature of 20-25° C. and washed with distilled water. The cell is immersed into the solution and after 5-10 seconds, the conductivity is of the solution is read. The sodium acetate content is calculated as follows:

NaOAc content on %=conductivity (4% solution)×0, 002875

NaOAc content on %=conductivity (8% solution)×0, 001687

NaOAc content on %=conductivity (20% solution)× 0,001063.

Measurement of Degree of Hydrolysation:

Degree of hydrolysation indicates percentage of vinyl acetate unit saponified to vinyl alcohol unit and it is calculated by following equation. EV standards for Ester Value which is the number of mg KOH needed to neutralize the acid released from the ester by saponification in 1 g of substance and it is measured according to EN ISO 3681.

Degree of hydrolysation=100×(100−0.1535×EV)/ (100−0.0749×EV)

Measurement of Vinyl Acetate Content

The vinyl acetate content is calculated from the degree of hydrolysation (DH) by following equation.

Vinyl acetate content=100−DH

Measurement of Degree of Polymerization

The degree of polymerization is measured according to JIS K6727. Specifically, it may be calculated by the equation below from the limiting viscosity [η] (unit: L/g) measured in water at 30° C. after resaponification and purification of the PVOH.

Degree of polymerization=([η]×10000/8.29)$^{(1/0.62)}$

Viscosity:

For the measurements 4 wt % solutions in distilled water were prepared. The measurements were performed in a falling ball viscometer according to DIN 53 015.

Preparation of PVOH Compositions for 3D Printing

PVOH compositions were prepared by compounding in a twin screw extruder as described in WO 03/020823 A1. Optionally filaments with a diameter of 1.75 mm or 2.85 mm, respectively, for 3D printing tests by fused filament fabrication (FFF) technology were extruded with a 30 mm single screw extruder by a process commonly known to those skilled in the art.

Measurement of Thermal Degradation in 3D Printing

Yellowing is a strong indicator for degradation of PVOH. During degradation of PVOH typically the material becomes more and more yellow. From a certain point also the melt viscosity starts to increase, due to crosslinking. Both processes occur in parallel. For determining the thermal stability of PVOH in a 3D printing process a dual extruder 3D printer (e.g. Ultimaker 3, Felix Pro 2, MakerBot Replicator 2X, Flashforge Creator Pro, . . . ) was used. Nozzle 1 was used for printing with a typical 3D printing material such as PLA and nozzle 2 was used for printing with PVOH. During printing material is deposited repeatedly with each nozzle layer by layer. During printing with nozzle 1 the material in nozzle 2 is kept at a certain idle temperature with no material flow and vice versa. A solid block with a base area 15×15 mm$^2$ and a height of 20 mm was printed with nozzle 1 to generate a constant time delay between printing of each layer with nozzle 2. At the same time a upright standing isosceles triangle with a base area of 10×2 mm$^2$ and a height of 20 mm was printed with nozzle 2. In this way the material volume printed with nozzle 2 will decrease from layer to layer, resulting in a gradually increasing residence time of PVOH in the heated nozzle. The yellowness gradient from the large base of the triangle to the small tip provides information about the thermal stability of the PVOH resin.

COMPARATIVE EXAMPLE 1

A filament of a PVOH formulation based on a PVOH grade with a degree of polymerization of 500, a degree of hydrolyzation of 73.2% and a NaOAc content of 0.82 whght % was subjected to the above mentioned thermal degradation test by 3d printing. The printing temperature was set to 215° C. and the idle temperature to 190° C. The printing speed was set in a way that the entire print took 90 minutes to complete.

The PVOH filament was already slightly yellowish, due to thermal degradation during sample preparation. The lower part of the printed triangle exhibited about the same slightly yellow color as the employed filament, but the upper half of the triangle showed strongly increasing yellowing, indicating significant thermal degradation of the PVOH resin.

EXAMPLE 1

A filament with the same PVOH resin formulation as in comparative example 1, but based on a PVOH grade with a degree of polymerization of 500, a degree of hydrolyzation of 73.3% and a NaOAc content of 0.16 wt. % was subjected to the same test as described in example 1. The PVOH filament was virtually colorless. The printed triangle was virtually colorless from the base to the tip.

COMPARATIVE EXAMPLE 2

The same filament as in comparative example 1 was subjected to the same thermal degradation test as described in comparative example 1, but with the printing and idle temperature being 215° C. The entire printed triangle showed pronounced yellowing, which was increasing from the base to the tip.

EXAMPLE 2

The same filament as in example 1 was subjected to the same test as described in comparative example 2. The printed triangle exhibited a very slightly yellowish color, which was not significantly changing from the base to the tip.

The invention claimed is:

1. A process for manufacturing a three-dimensional object, the process comprising:
   depositing and solidifying molten polyvinyl alcohol (PVOH) to form a support structure comprising PVOH throughout the entire support structure;
   depositing and solidifying a molten thermoplastic polymer on the support structure to form a three-dimensional preform; and
   dissolving the support structure to from the three-dimensional object
   wherein the polyvinyl alcohol (PVOH) has an alkaline acetate content of less than 0.5 wght %.

2. The process according to claim 1, wherein characterized in that the polyvinyl alcohol (PVOH) has a vinyl acetate content of at least 10 mol %.

3. The process according to claim 1, wherein the polyvinyl alcohol (PVOH) has a degree of polymerization of at least 200-3000.

4. The process according to claim 1, wherein the polyvinyl alcohol (PVOH) has a degree of hydrolysation DH of 60-99%.

5. The process according to claim 1, wherein the support structure is dissolved in water.

6. The process according to claim 1, wherein the molten polyvinyl alcohol (PVOH) is deposited at a temperature of at least 170° C.

7. The process according to claim 1, wherein the thermoplastic polymer is deposited on the support structure at a temperature of at least 140° C.

8. The process according to claim 1, wherein the thermoplastic polymer is selected from the group consisting of polylactic acid (PLA), acrylonitrile-butadiene-styrene copolymer (ABS), polyamides (PA), polycarbonates (PC), polyethylene terephthalate (PET), polyethylene terephthalate copolymers (PETG), polyhydroxyalkanoates (PHA), wood filled composites, metal filled composites, carbon fiber filled composites, polyvinylbutyral (PVB), thermoplastic elastomers (TPE), thermoplastic polyurethanes (TPU), polyolefins, polypropylenes (PP), acrylonitrile styrene acrylate (ASA), polyacrylates, polymethacrylates, polystyrene (PS), polyoxymethylene (POM) and mixtures thereof.

9. The process according to claim 1, wherein the polyvinyl alcohol (PVOH) comprises as repeating units vinyl alcohol, vinyl acetate and up to 20 Mol % of at least one further olefinic monomer.

10. The process according to claim 1, wherein the polyvinyl alcohol (PVOH) comprises no plasticizer or up to 20% by weight of one or more plasticizers.

11. The process according to claim 1, wherein the polyvinyl alcohol (PVOH) comprises no plasticizer.

12. The process according to claim 1, wherein the polyvinyl alcohol (PVOH) comprises up to 20% by weight of one or more plasticizers.

13. The process according to claim 1, which is a dual material printing process wherein a thermoplastic polymer is used as print material and PVOH is used as support material.

* * * * *